Figure 13:
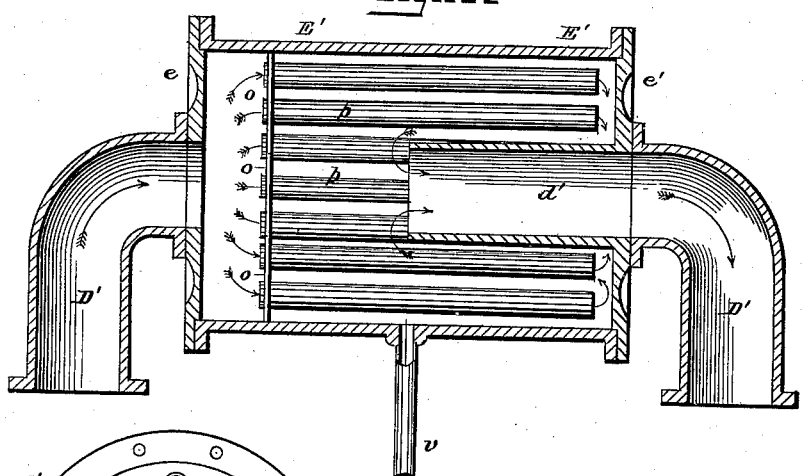

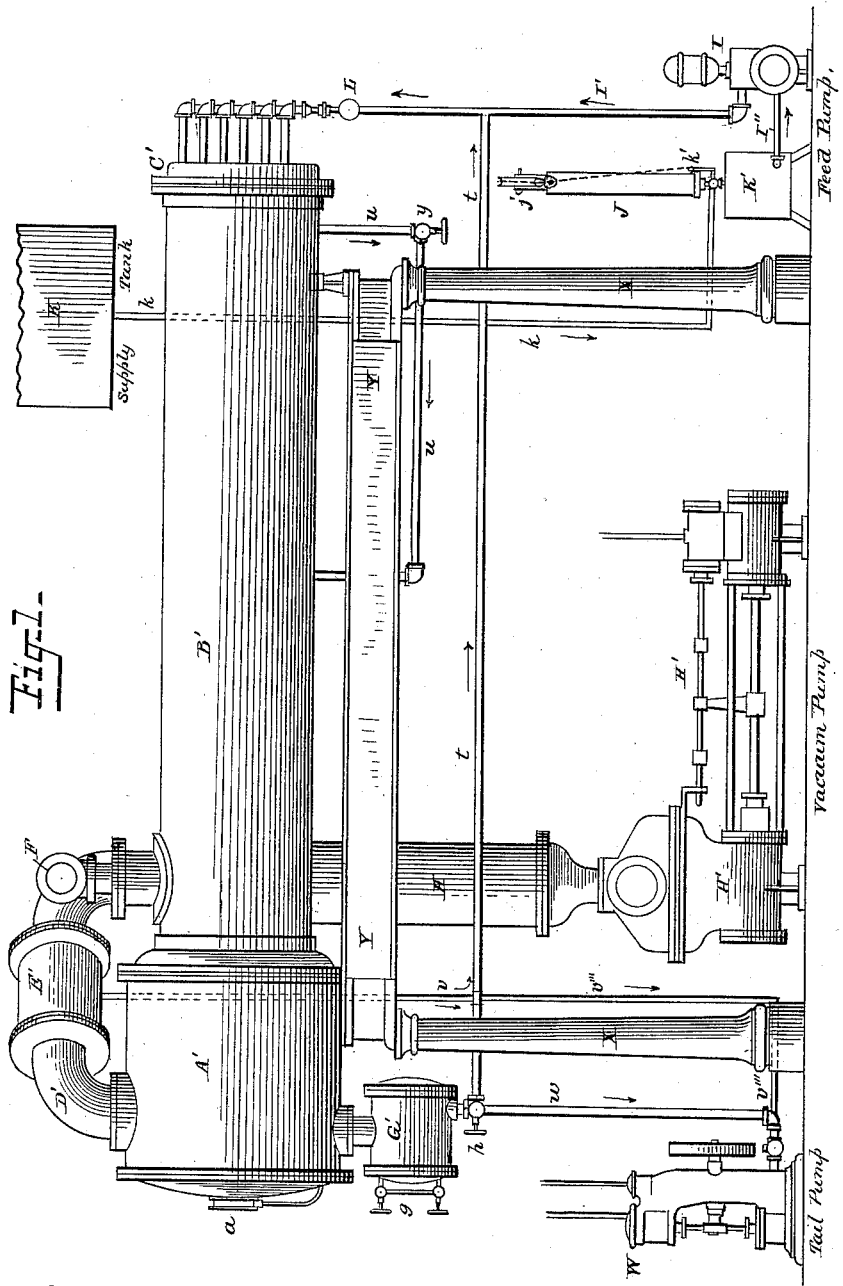

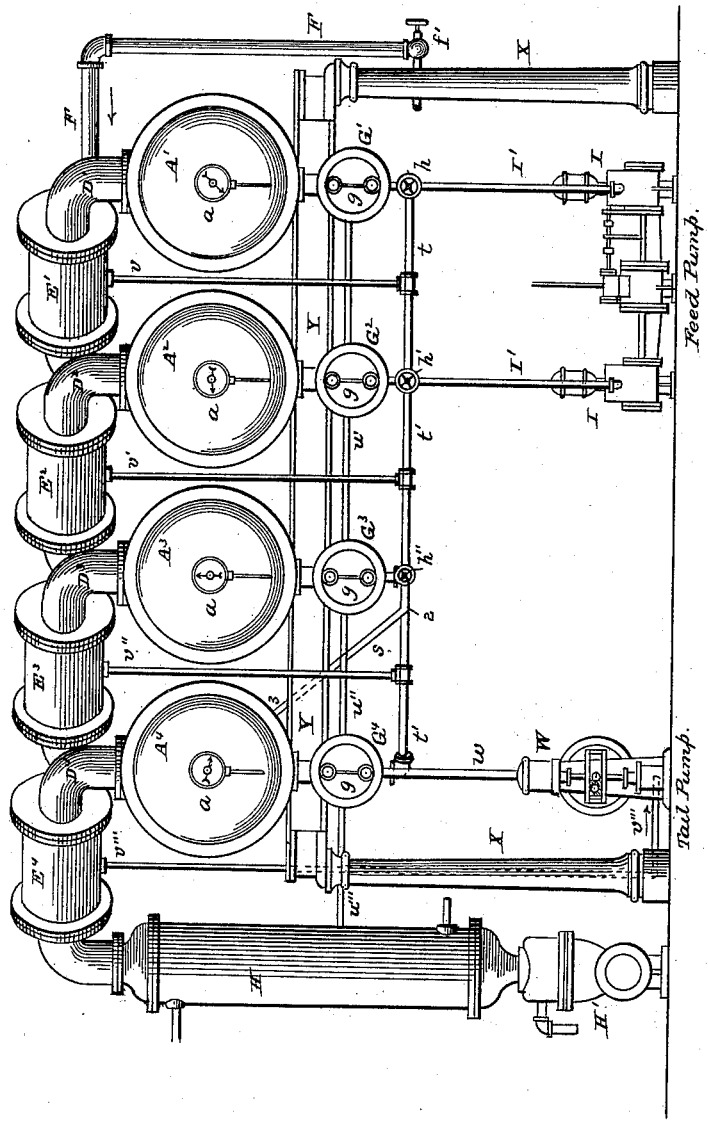

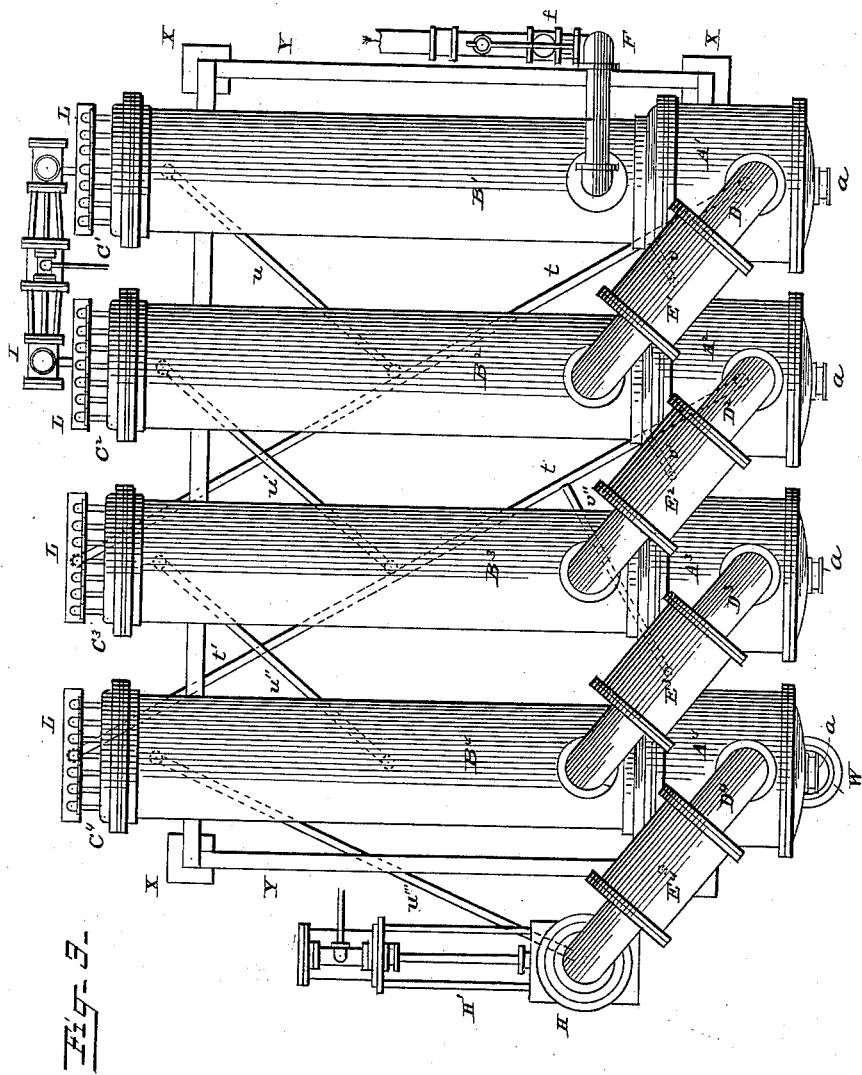

(No Model.) 9 Sheets—Sheet 4.
H. T. YARYAN.
VACUUM EVAPORATING APPARATUS.
No. 383,384. Patented May 22, 1888.
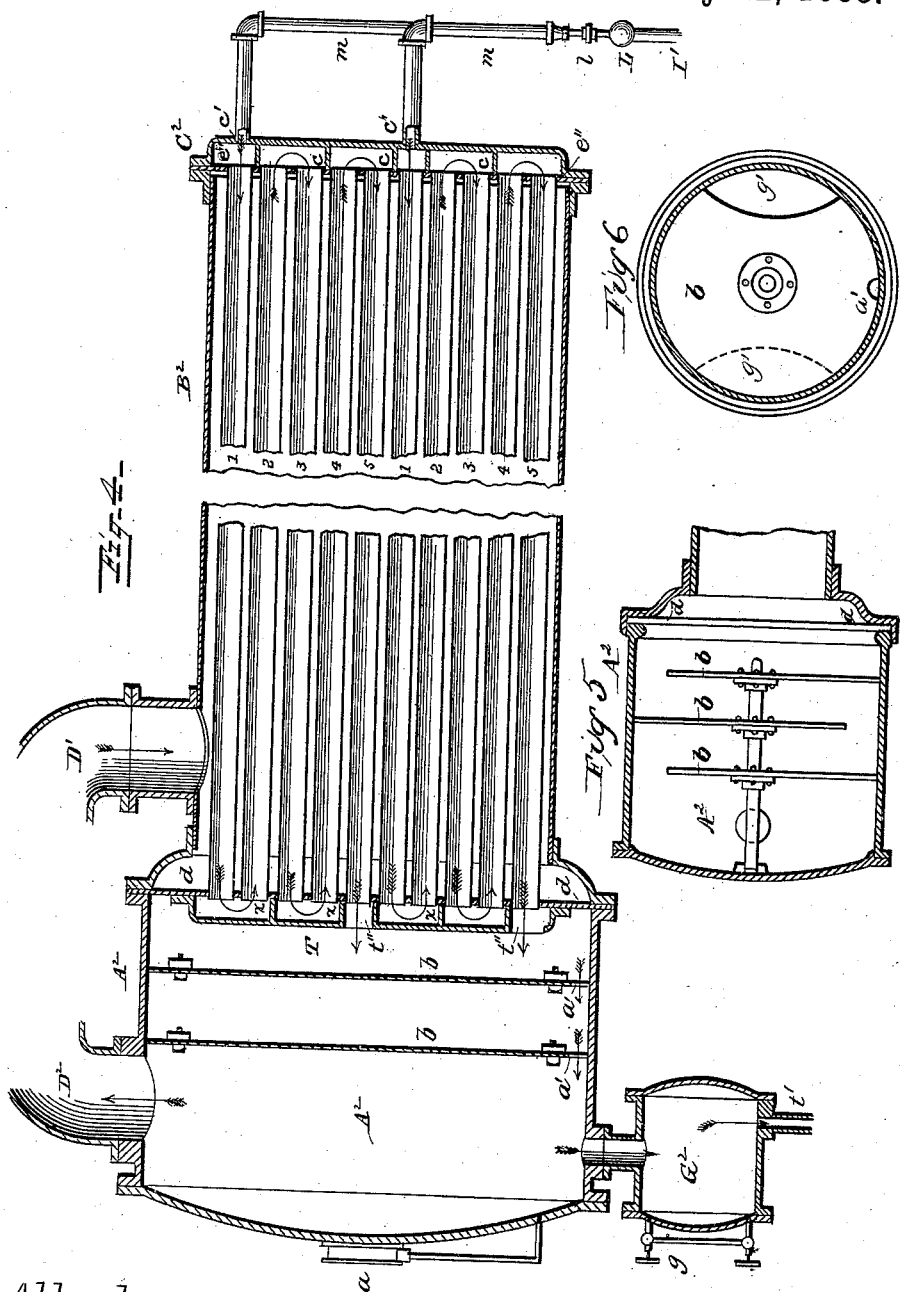

(No Model.)  9 Sheets—Sheet 5.
H. T. YARYAN.
VACUUM EVAPORATING APPARATUS.
No. 383,384.   Patented May 22, 1888.
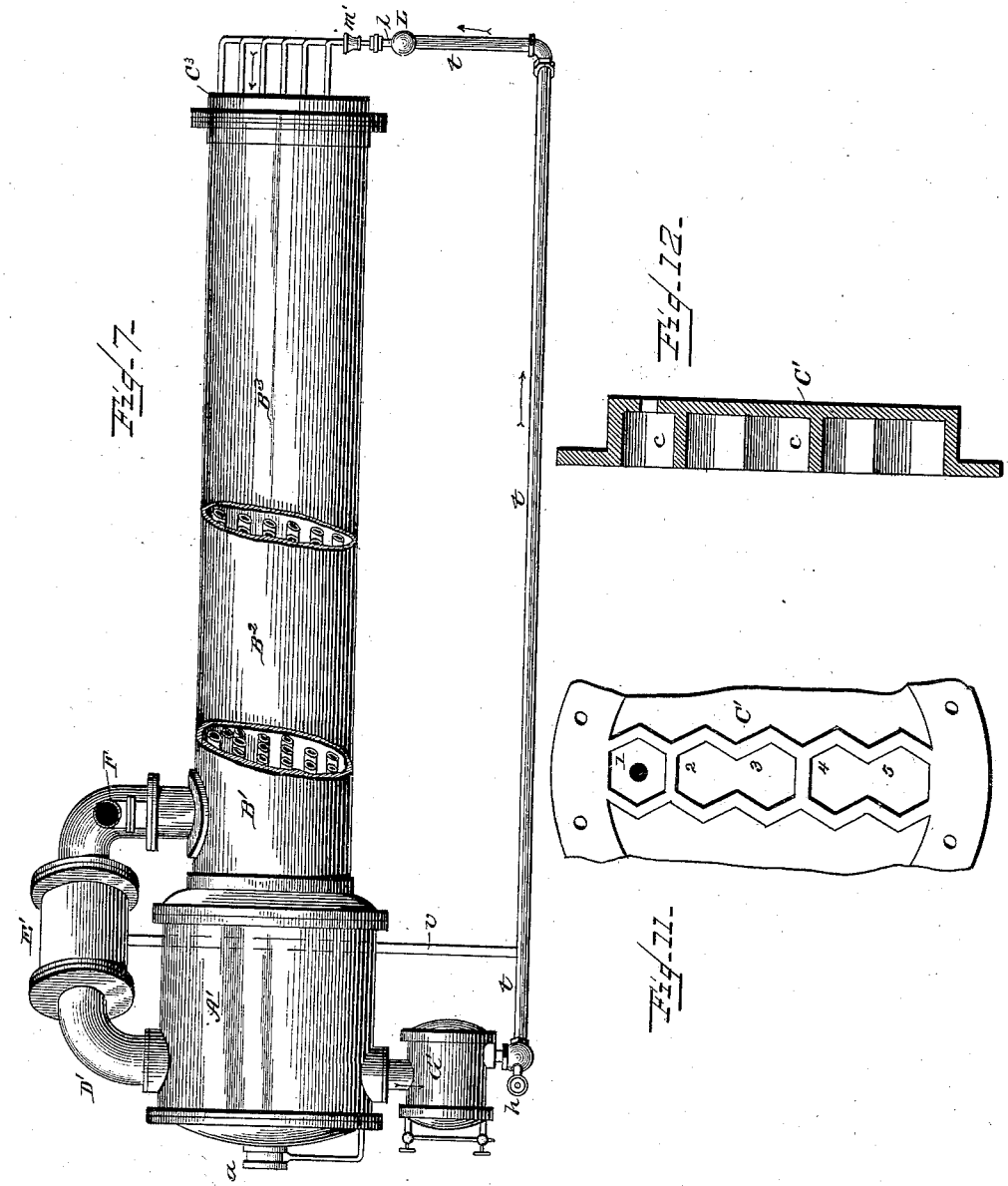

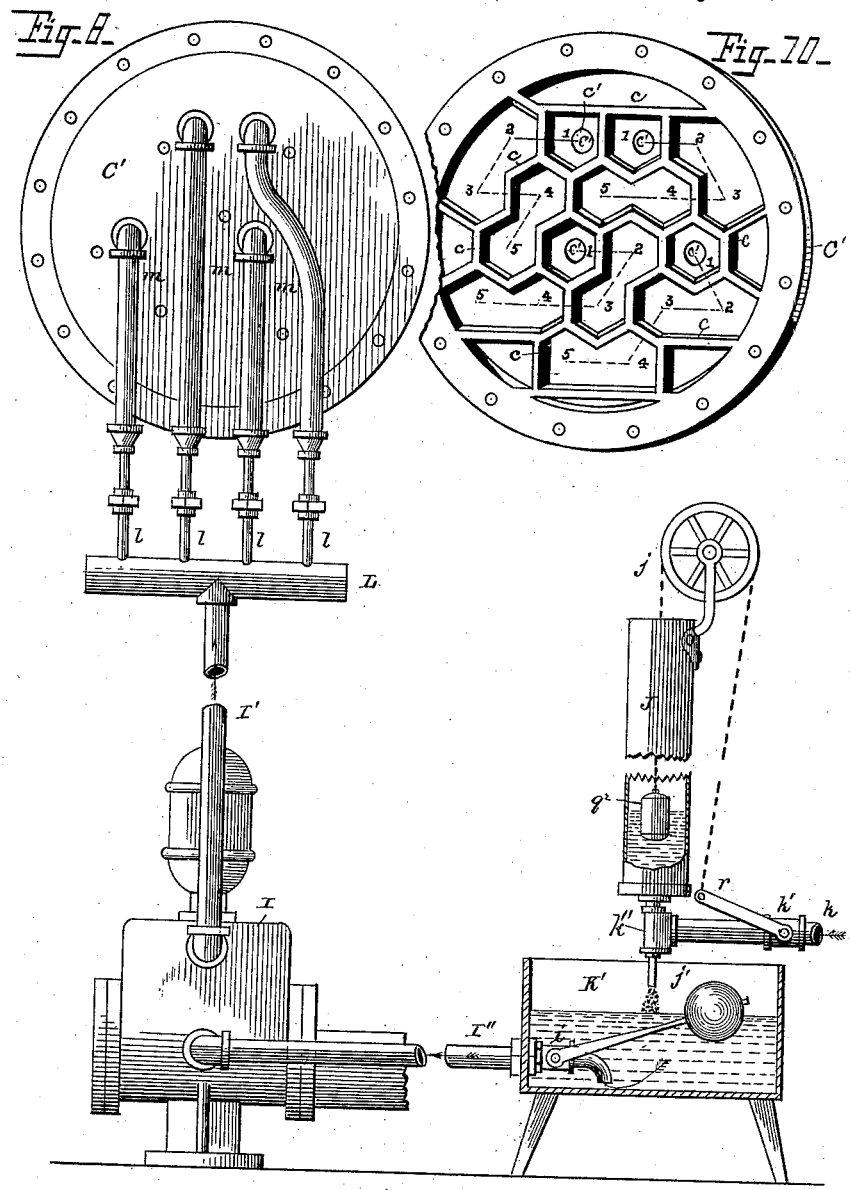

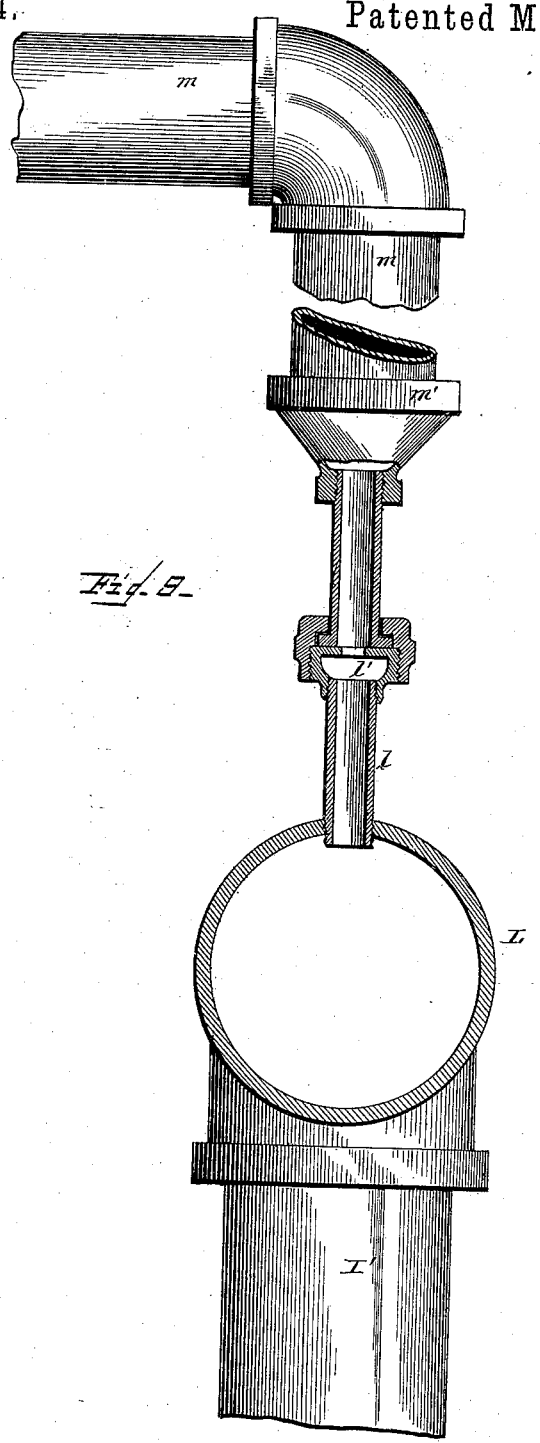

(No Model.) 9 Sheets—Sheet 8.

H. T. YARYAN.
VACUUM EVAPORATING APPARATUS.

No. 383,384. Patented May 22, 1888.

Attest:
Edwin L. Yewell.
John Enders Jr

Inventor:
Homer T. Yaryan.
By E B Clark.
Atty (No Model.) 9 Sheets—Sheet 9.
H. T. YARYAN.
VACUUM EVAPORATING APPARATUS.
No. 383,384. Patented May 22, 1888.
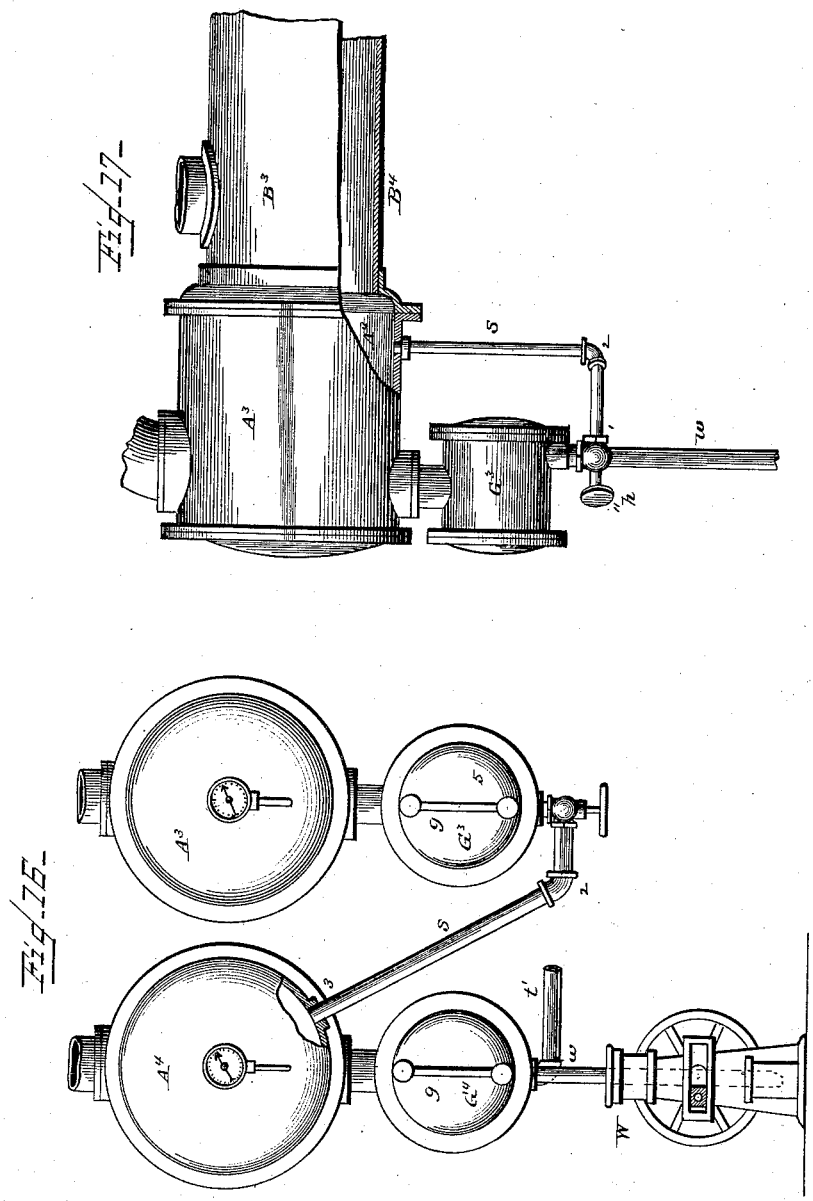
WITNESSES,
Edwin I. Yewell,
John Enders Jr.
INVENTOR.
Homer T. Yaryan.
By E. B. Clark,
Attorney.

UNITED STATES PATENT OFFICE.

HOMER T. YARYAN, OF TOLEDO, OHIO.

VACUUM EVAPORATING APPARATUS.

SPECIFICATION forming part of Letters Patent No. 383,384, dated May 22, 1888.

Application filed September 13, 1887. Serial No. 249,584. (No model.) Patented in England January 5, 1888, No. 213; in Belgium January 5, 1888, No. 80,183, and in France January 5, 1888, No. 187,994.

*To all whom it may concern:*

Be it known that I, HOMER T. YARYAN, a citizen of the United States, residing at Toledo, in the county of Lucas and State of Ohio, have invented certain new and useful Improvements in Vacuum Evaporating and Distilling Apparatus, (for which Letters Patent have been granted to me in Great Britain January 5, 1888, No. 213; in Belgium January 5, 1888, No. 80,183, and in France January 5, 1888, No. 187,994;) and I do hereby declare the following to be a full, clear, and exact description of the invention, such as will enable others skilled in the art to which it appertains to make and use the same.

This invention relates to an improved evaporating and distilling apparatus operated in multiple effects, in which the evaporation takes place while the liquid is flowing through heated coils of pipe or conduits, and in which the vapor is separated from the liquid in a chamber at the discharge end of the coils and is conducted to the heating-cylinder surrounding the evaporating-coils of the next effect from the first to the last effect.

The objects of the invention are, first, to provide extended vaporizing coils or conduits and increased heating-surface for each liquid-feed supply in the heating-cylinders and provide improved means for feeding the liquid, whereby each set or coil of vaporizing-tubes will receive a positive and uniform supply of liquid without danger of the feed-ducts being clogged by extraneous matter; second, to positively control the amount of liquid fed by the pump to the evaporating-coils and make it more uniform than heretofore, regardless of the speed of the pump; third, to provide improved separating-chambers at the discharge ends of the vaporizing-coils, so as to better free liquid and solid particles from the vapors; fourth, to provide for the successful and economical treatment of the most frothy liquids, such as cause much trouble by excessive priming, by causing the vapors carrying solid and liquid particles to pass through catch-all chambers, where such particles are arrested and precipitated and then returned to the evaporating-coils; fifth, to secure a more positive flow and circulation of liquid from the evaporating-cylinder of one effect to another under the influence of a better vacuum than heretofore in multiple-effect vacuum evaporating and distilling apparatus; sixth, to provide for transferring a hotter concentrated liquid into the separating-chamber containing a cooler concentrated liquid in direct connection with the condenser and vacuum-pump, so as to equalize the temperature of the two liquids, and then draw off both by one tail-pump.

My present invention comprises, more particularly, improvements on the apparatus described and shown in my patent, No. 355,289, dated December 28, 1886, and covers a number of important modifications in construction, whereby improved results are secured, as follows:

In practical working it has been demonstrated that where the liquid to be evaporated is fed into each tube having but a small extent of heating-surface a relatively small feed is required. Where the copper vaporizing-tubes are three inches in diameter and sixteen feet long, this feed cannot be more than three-sixteenths of an inch, within which a taper pin must be worked according to the construction of my above-mentioned patent. When it is desired to decrease the amount of feed by reducing the size of the opening, the entering pin forms a thin annular opening through which the liquid must pass. With a perfectly-pure liquid the feed can be adjusted to a nice point by the withdrawal or insertion of the taper pins; but when a material is to be worked which contains impurities these annular openings are constantly being closed by obstructions to the feed, and the particular tubes thus clogged are consequently thrown out of use. To avoid this difficulty and to facilitate the means of cleaning the tubes, I have devised a solid metal head so constructed with partitions that when they are fitted in position against the tube-sheet they form the equivalents of return-bends and throw the tubes into sets of five, forming practically a coil of three-inch pipe sixty feet long. This allows me to feed five times the quantity, as by the old plan, of liquid to be evaporated, since I have five times the extent of heating-surface, and as a consequence the area of the opening to each set of tubes can be enlarged five times. In order to feed each set of tubes contained within the cylinder, I construct a manifold which allows of a distinct feed-duct to each set of tubes, and the area in cross-section of this feed may be one-half inch, which is sufficiently large to prevent its being closed by ordinary impurities. In the triple-effect apparatus, which will evaporate, say, sixty thousand gallons in twenty-four hours, it requires twelve sets of these tubes (five tubes in a set) in each cylinder, and as each effect has the same number of tubes the manifolds are all alike and similar to the one just described. The head with partition, which is inside the separating-chamber against the flue-sheet, covering the inner ends of the tubes, has an opening of the full size of the tube from each fifth tube, to permit the vapor and condensed liquid to be discharged into the separating-chamber.

It has also been found by experience that the float-chamber described in my former patent is not necessary in connection with my new construction, and is really an objection, as the passage of a small quantity of vapor through the manifold causes a more equal distribution of the feed, owing to the varying height of the several feed-pipes for each set or coil of vaporizing-tubes.

It has also been found in working frothy liquids—such as the waste alkali from wood pulp—that the separating-chambers fill with froth and have a tendency to prime. To avoid this difficulty I have introduced catch-all chambers, through which all the vapors must pass from the separating-chamber of one effect to the heating-cylinder of the next effect. The catch-all chamber consists of a cylinder which has an interposed plate, and into this plate are expanded a number of small tubes, through which the vapor must pass to the opposite end of the cylinder and impinge against another plate, which has the effect of precipitating and accumulating the solid and liquid matters, so that they can return to the original liquid in the coils. The principle involved in the action of this catch-all is the use of small tubes which permit the ends to be approached near to the plate, so that the momemtum which the liquid or solid matter in the vapor has attained will carry it forward against the impinging-plate, where it adheres and runs out of the drip-pipe.

Sometimes small tubes and the impinging-plate are arranged within the separating-chamber in place of making a separate catch-all. When arranged in this way, the first dash-plate acts as a flue-sheet, into which a number of one-inch tubes about six inches long are expanded, and extend to within one inch of the second dash-plate, care being used not to place any tubes opposite the opening of the second dash-plate. Any entangled liquid which is not precipitated as it discharges from the fifth pipe of the evaporating-coil will be effectually separated by this arrangement.

The next modification and improvement in this apparatus, as compared with the patent, No. 355,289, of December, 1886, is the arrangements for feeding the liquid through the separate effects, and consists in so arranging the pipes as to make a more positive circulation. Where exhaust-steam with five pounds pressure is used as the heating medium in the first effect, and where the number of effects are increased to four, the vacuums on the separate effects would read about as follows: on the first effect, three inches; second, eleven inches; third, nineteen inches; fourth, twenty-six inches. In constructing very large apparatus, and where the cylinders containing the coils are six feet in diameter, the difference in vacuum between the first and second effect is not sufficient to get a reliable feed to the upper coils. In order to remedy this difficulty, I provide a feed direct from the liquid-supply pump to coils in the cylinders of both the first and second effects, and run the liquid-discharge pipe from the separating-chamber of the first effect to the manifold and feed-ducts of the third effect, and from the separating-chamber of the second effect to the manifold and feed-ducts of the fourth effect, thereby securing the advantages of the superior vacuums in the cylinders nearer the exhaust-pump, and consequently a better and more positive circulation of liquid through the coils and from one effect to another throughout the series. As the evaporating-surfaces in all the effects are alike, and as the amount of liquor pumped to the first and second effects is equal, it results that the liquor finished in the third effect will be of the same gravity as that finished in the fourth effect; but the temperature of the liquor in the third effect will be higher than that in the fourth effect, and hence it is impractical for one tail-pump to remove the liquor from the third and fourth effects by direct connection. I obviate this difficulty by making a cross-connection from the separating-chamber of the third to that of the fourth effect, and passing the liquor through this connection from the third to the fourth effect, where the latent heat escapes with the vapor to the condenser, cooling the liquid down to the temperature of that in the fourth effect, which will then allow of removal by the tail-pump of the fourth effect. This arrangement of allowing the liquid from the third effect to pass over to the fourth has two advantages, one of which is to save an extra pump for the third effect, and the second is to remove the excessive heat held by the liquid.

In the patent of December, 1886, no arrangement was shown for regulating the amount of feed except by the speed of the feed-pump, which is found by experience not to be reliable. In order to make the supply absolutely uniform regardless of the speed of the pump, a feed-regulator consisting of a float and valve is arranged in the liquid-supply box, with which the suction-pipe of the pump is connected, and as a given amount of liquid is constantly running into the box, should the pump run too fast, the float lowers and prevents air from being drawn into the apparatus through the pump, and also prevents an excess of liquid from being forced to the evaporating-coils.

Having stated the nature and object of my invention, I will describe it in detail with reference to the accompanying drawings, in which—

Figure 14:
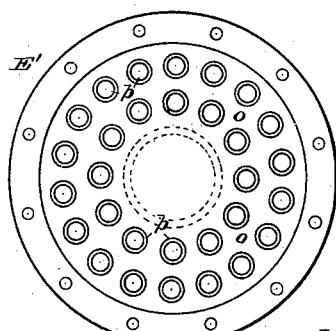
Figure 15:
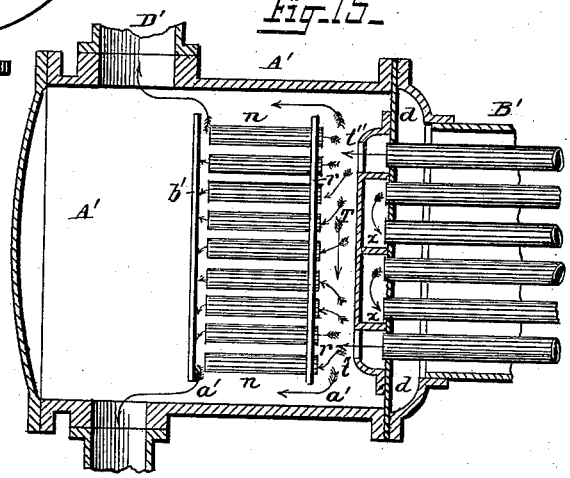

Figure 1 represents a side elevation of the apparatus. Fig. 2 represents a front end elevation. Fig. 3 represents a top plan. Fig. 4 represents a vertical longitudinal section of a cylinder, showing the evaporating-coils and separating-chamber. Fig. 5 represents a horizontal section, and Fig. 6 a vertical transverse section, on a reduced scale, of the separating-chamber shown in Fig. 4. Fig. 7 represents a broken section of the cylinders for showing the connection of the liquid-pipe from the first to the third effect evaporator. Fig. 8 represents a rear end view of a cylinder with manifold, the feed-pump, and a sectional view of the feed-box and supply devices. Fig. 9 represents a sectional view, on an enlarged scale, of the manifold and a feed-duct. Fig. 10 represents an inside view of a return-bend head. Fig. 11 represents an inner view of a section of the head; Fig. 12, a vertical cross-section thereof, on an enlarged scale, and showing the partitions forming cells for connecting the ends of the evaporating-tubes. Fig. 13 represents a vertical longitudinal section of a catch-all chamber. Fig. 14 represents a cross-section thereof. Fig. 15 represents a vertical longitudinal section of my new form of separating-chamber. Fig. 16 represents an end view, and Fig. 17 represents a side view, of the cylinders for showing the pipe connection between the separating-chambers of the third and fourth effect evaporators.

The evaporating-cylinders are mounted upon a frame-work, Y, supported upon columns X X, or other suitable supports. I have shown the apparatus arranged as quadruple effect, with four connected cylinders; but I construct multiple-effect apparatus with an increased number of cylinders, up to ten or twelve. The heating-cylinders $B'$ $B^2$ $B^3$ $B^4$, containing the evaporating tubes or coils, are preferably arranged in the same horizontal plane, and are provided at the discharge ends of the evaporating-coils with separating-chambers $A'$ $A^2$ $A^3$ $A^4$, of enlarged diameter, and at the supply ends of the coils with return-bend heads $C'$ $C^2$ $C^3$ $C^4$. From each separating-chamber $A'$ $A^2$ $A^3$ vapor-pipe $D'$ $D^2$ $D^3$ leads into the shell of the next heating-cylinder, as $B^2$ $B^3$ $B^4$, and vapor-pipe $D^4$ leads from the last separator, $A^4$, to the condenser H and vacuum-pump $H'$. A cylindrical catch-all chamber, $E'$ $E^2$ $E^3$ $E^4$, is connected in each vapor-pipe between each separator and each successive heating-cylinder, as shown in Figs. 1, 2, and 3, and in detail in Fig. 13. Gage-glass and liquid-receiving chambers $G'$ $G^2$ $G^3$ $G^4$ connect with the bottom of each separating-chamber for receiving the liquid as it is separated from the vapor, and a gage-glass, $g$, is applied to each of such chambers. Liquid discharge and transfer pipes $t$ $t'$, having valves $h$ $h'$, as best shown in Figs. 1, 3, and 7, lead, respectively, from chambers $G'$ $G^2$ of the first and second effect to the manifold feed-pipes leading into cylinders $B^3$ $B^4$ of the third and fourth effect, for the purpose hereinafter fully described. The main steam-supply pipe F, having safety-valve $f$ and stop-valve $f'$, Figs. 1, 2, and 3, connects with heating-cylinder $B'$ of the first effect. The evaporating-tubes 1 2 3 4 5 are expanded or otherwise secured in the tube-sheets $d$ and $e''$ at opposite ends of the cylinders, and are properly connected at the ends in sets of five to form coils. The outer rear return-bend heads, $C'$ $C^2$, &c., are provided on their insides with numerous short intersecting partition-plates $c$, forming single and double cells properly arranged for connecting the evaporating-tubes in sets of five, as illustrated in Figs. 10, 11, and 12. The inner face of the heads and the edges of the partitions $c$ are ground, so as to make a tight joint with the tube-sheet $e''$, and the two are drawn together by bolts. The heads are pierced with holes $c'$, for connecting the liquid-supply pipes $m$ of the manifolds L. The inner return-bend heads, T, in the separating-chambers are formed, like heads $C'$ $C^2$, &c., with intersecting partition-plates $x$, and are provided with discharge-openings $t''$ for every fifth tube, as shown in Fig. 4. Tube-sheet $d$ is made of considerably larger diameter than cylinder $B'$ $B^2$, &c., and acts as a vibrating diaphragm to accommodate the expansion and contracting of the tubes.

The separating-chambers may be constructed with dash-plates $b$ $b$, two or more in number, having openings $g'$ $g'$ alternately upon opposite sides for the passage of vapor, and openings $a'$ at the bottom for the passage of liquid, as in my former patent, or with my improved arrangement of tubes and plate shown in Fig. 15. Here a tube-sheet, $r$, is provided near the openings of the evaporating-tubes, and in such sheet are set numerous small horizontal tubes, $n$, which discharge against a vertical arresting-plate, $b'$, set near their open ends. Watery and solid matters are impelled against the plate and thereby arrested and caused to flow down to the bottom of the chamber. A vacuum-gage, $a$, is applied to the end of each separating-chamber. The liquid-feed apparatus consists of supply-tank K, placed at any suitable elevation, stand-pipe J, feed-box $K'$, double pump I, manifold L, and connecting-pipes and valves. Pipe $k$, leading from supply-tank K, connects by means of a T-coupling, $k''$, with the bottom of stand-pipe J, and a small feed-nozzle, $j'$, projects from the lower end of such T-coupling and discharges directly into box K'. The liquid to be evaporated flows from tank K through pipe $k$ to stand-pipe J and box K', the flow being made constant and uniform and of the desired quantity by means of a valve, $k'$, having a connected lever-handle, $r'$, which is connected by a cord or chain passing over pulley $j$ with float $q^2$ in stand-pipe J. The valve-opening in pipe $k$ being properly adjusted by means of float $q$, lever $r$, and the connecting-cord, the liquid is admitted to stand-pipe J, where the column of liquid is automatically maintained at any desired height and consequent pressure, regardless of the quantity in the supply-tank, by means of float $q$, which, as it rises, tends to close valve $k'$, and as it falls tends to open said valve. From the bottom of stand-pipe J and its connected T-coupling $k''$ the nozzle $j'$ discharges a constant and uniform stream of liquid into feed-box K'. The suction-pipe I'' of pump I extends into box K', where it terminates in a turned-down nozzle provided with valve $i$, having a lever-handle, $z'$, and float $z$. By means of this valve and float the amount of liquid drawn by the pump and forced to the evaporating-coils is made absolutely uniform, regardless of the speed of the pump, which is apt to vary.

As a given amount of liquid is constantly running into the box, should the pump run too fast, the float lowers, partially closing the valve and lessening the amount of liquid drawn at each stroke of the pump, and preventing air from being drawn in, since the end of the suction-pipe is always sealed by the liquid. The liquid is forced by pump I into the manifolds L, from which it flows through contracted ducts $l$ into the enlarged feed-pipes $m$, as shown in Figs. 8 and 9. Ducts $l$ are of about one-half-inch diameter, and the upper and lower sections thereof are connected by a union-coupling, one portion of which, $l'$, has a reducer with opening of one-quarter-inch diameter, (more or less, according to the amount of liquid it is desired to feed.) Pipes $m$ are of one-and-a-quarter-inch diameter, and are connected to ducts $l$ by reducers $m'$.

The liquid being forced under pressure by the pump, it will flow in approximately uniform quantities through all the contracted ducts to the evaporating-tubes at varying heights in the cylinders. As soon as the liquid enters the enlarged pipes $m$ it is favorably affected by the vacuum of the evaporating-coils and the flow accelerated, particularly to the upper coils. A double feed-pump being used, the liquid is forced thereby positively into cylinders B' B² of the first and second effects, as shown in Figs. 2 and 3. For convenience of illustration but four feed-pipes $m$ are shown, feeding into four sets of evaporating-coils; yet in practice I arrange twelve or more sets of coils in the cylinders and provide a corresponding number of feed-pipes. The heating-surface for each feed-supply being much increased by the extended pipe in the form of a coil, the feed-openings can be advantageously enlarged to one-half inch, as in ducts $l$, and clogging and obstructions with impurities thereby avoided and greatly-improved results secured, since every set of tubes is certain to have its supply of liquid and thus perform its required duty.

The catch-all chambers E' E², &c., Figs. 1, 13, and 14, are provided each at its inlet end $e$ with a tube-sheet, $o$, extending across its diameter a short distance in front of the opening of vapor-pipe D', and in such sheet are fixed numerous longitudinal tubes, $p$, extending to near the opposite head $e'$, so that the vapors carrying watery or solid particles are impelled against the head and arrested. The inwardly-extending escape-pipe $d'$ is cast with or otherwise secured to head $e'$, and causes a return of the vapors, preventing any watery or solid particles from being blown directly into the vapor-pipe D'. Liquid and solid matter arrested in the catch-all chambers flow through pipes $v\ v'\ v''$ down into the fluid-transfer pipes $t\ t'$, as shown in Figs. 2, 3, and 7, and thence into the evaporating-coils, and through pipe $v'''$ directly to the tail-pump W, Fig. 2. By use of the catch-all chambers the most frothy liquids can be readily and economically managed. A liquid-transfer pipe, $s$, having valve $h''$, leads directly from receiving-chamber G³ of the third effect to separating-chamber A⁴ of the fourth effect, as shown in Figs. 2, 16, and 17, to conduct finished liquid into such separator, where it is cooled to the same temperature as the liquid finished in the fourth effect, the latent heat being carried off in the vapors drawn by the vacuum-pump H' into the condenser H, and the finished liquid of both effects is drawn off through pipe $w$ by one and the same tail-pump, W. The water of condensation accumulating in the heating-cylinders B' B², &c., is transferred from one to the other through connecting-pipes $u\ u'\ u''$, having valves $y$, (shown in Figs. 1, 2, and 3,) and finally from cylinder B⁴ through pipe $u'''$ directly into condenser H.

The operation of the apparatus is as follows: The feed-pump I, having its suction-pipe I'' in connection with the feed-box K', is started, and at the same time vacuum-pump H', which produces a partial vacuum throughout the apparatus. As soon as liquid appears in glass gage $g$ of receiving-chamber G⁴, Fig. 2, the tail-pump W is started, and steam is admitted by pipe F into cylinder B' of the first effect and the pressure properly regulated. The liquid flows uniformly into the evaporating-coils of cylinders B' B² in properly-regulated quantities, as heretofore described. The liquid is first partially evaporated in the coils of cylinder B', and the vapor and reduced liquid are discharged into separating-chamber A', where, under the influence of enlarged area and the mechanical effects of the dash-plates or short tubes and arresting-plate, the liquid and vapors are separated, the hot vapor passing off through pipe D' into heating-cylinder B² of the second effect in contact with the evaporating-coils, for heating and causing evaporation of the liquid passing through them. The partially-reduced liquid passes through the bottom openings, a', of the dash-plates and flows into receiving-chamber G', and thence through pipe t, Figs. 3 and 7, into the manifold L and feed-pipes supplying the evaporating-coils of cylinder B³ of the third effect, in which coils is maintained a better vacuum than in the coils of cylinder B², whereby the flow and transfer of the liquid are more positively and rapidly accomplished than would be the case if the liquid-pipe connected the first with the second effect evaporator. Liquid is supplied by pump I to the coils of second effect in cylinder B². The partially-reduced liquid and hot vapors are separated in chamber A², as before explained, and the hot vapor or steam is conducted by vapor-pipe D² into cylinder B³ around the contained evaporating-coils. The partially-reduced liquid flows into receiving-chamber G², and thence by transfer-pipe t' into the manifold and feed-pipes supplying the evaporating-coils of cylinder B⁴ of fourth effect, where a superior vacuum is maintained. In case exhaust-steam at five pounds pressure is used as the heating medium in cylinder A' of the first effect the vacuum-gages of the separate effects would indicate about as follows: on the first effect, three inches; second effect, eleven inches; third effect, nineteen inches, and fourth effect, twenty-six inches. The difference in vacuum between the first effect and the third effect is sixteen inches, while that between the first and second effects is only eight inches. Again, the difference in vacuum between the second effect and the fourth effect is fifteen inches, while that between the third and fourth effects is only seven inches. It is thus seen that in skipping one effect evaporator in making connections of the liquid-transfer pipes—as from the first to the third effect and from the second to the fourth effect—the advantages of an increased vacuum are obtained for causing better transfer feed and circulation of liquid to and through the evaporating-coils.

With my improved method of transferring and feeding the liquid the number of evaporators or effects can be increased to twelve or more and economically and successfully worked. The hot vapors separated in chamber A³ pass by pipe D³ into the cylinder B⁴ around the contained evaporating-coils, and the vapors arising in chamber A⁴ pass by pipe D⁴ directly to condenser H. Liquid from separating-chambers A' A² is finished in the evaporating-coils of cylinders B³ B⁴, and is of the same gravity in both; but that finished in coils of cylinder B³ and entering separating-chamber A³ is of a higher temperature, and before removal by the tail-pump is preferably reduced to the same temperature as that finished in the coils of the fourth effect, and to accomplish this result it is transferred by pipe S from receiving-chamber G³ directly into separating-chamber A⁴, where the latent heat escapes with the vapor to the condenser, and the liquid is cooled to the same temperature as that finished in the coils of cylinder B⁴. The concentrated liquid is then drawn off through tail-pipe w by pump W. Two advantageous results are thus effected, the first of which is to save an extra pump for the third-effect evaporator, and the second is to remove the excess of heat held by the liquid. The water of condensation is conducted from one cylinder to another, and finally to the condenser, by pipes u u' u'' u''', as before explained.

For some purposes—that is, the evaporation of liquids not particularly frothy—the catch-all chambers are dispensed with; but for frothy liquids which give trouble by priming they perform an economical and important function, as heretofore explained, and the liquid and solid matter collected in them is conducted by pipes v v' v'' into transfer-pipes t t', and thence into evaporating-coils, and by pipe v''', leading from the last one, directly to the tail-pump W.

Having described my invention, what I claim, and desire to secure by Letters Patent, is—

1. In combination with a heating-cylinder of an evaporating apparatus, the inclosed evaporating-coils composed of tubes having their ends connected by closed return bends or cells, so as to form continuous closed conduits from their inlet to their outlet ends, and a feed-pipe connecting with the inlet end of each coil, whereby liquid to be evaporated may be subjected to an increased length of heating-surface without danger of overflowing till it is properly heated and discharged at the outlet end of the coil.

2. The heating-cylinder of an evaporating apparatus containing evaporating-tubes set in tube-sheets at each end, in combination with a return-bend head provided with intersecting partitions forming cells to connect the ends of the tubes, applied to the inlet end of the cylinder, the liquid-supply pipes piercing such head, and a separating-chamber connecting with the cylinder at the discharge end of the tubes for receiving the heated liquid and vapor.

3. In combination with the heating-cylinder of an evaporating apparatus, a separating-chamber connecting with one end thereof, the sets of evaporating-coils inclosed in the heating cylinder and each opening into the separating-chamber at one end, and a feed-supply pipe connecting with the inlet end of each coil, for the purpose described.

4. In combination with the heating-cylinder containing evaporating-tubes set in the tube-sheets at each end, the return-bend heads provided with intersecting partitions forming cells to connect the ends of the tubes and form sets of coils, for the purpose described.

5. In combination with the heating-cylinder containing evaporating-tubes set in the tube-sheets, the return-bend head C′, provided with intersecting partitions c, forming cells and openings c′, for connecting the supply-pipes, and the return-bend head T, having partitions x and outlet-openings t″ for the discharge of liquid.

6. In combination with a heating-cylinder, the horizontal coils composed of sets of two or more connected tubes extending through the heating-cylinder, and a contracted liquid-feed duct connecting with the inlet end of each coil, whereby a reduced number of feed-ducts are required, and whereby the size of the ducts may be increased, so as to avoid the danger of their being clogged with solid matter.

7. In combination with the evaporating-coils and inclosing heating-cylinder, the externally-arranged manifold and contracted liquid-feed ducts connecting with the inlet ends of the coils, for the purpose described.

8. In combination with the series of evaporating-coils, the liquid-feeding apparatus consisting of a pump, a suction-pipe connecting it with a feed-box and having an automatic valve, a manifold, and contracted liquid-ducts connecting therewith and with the inlet ends of the coils, whereby each coil of the series may be fed by a single pump with the desired quantity of liquid.

9. In a vacuum evaporating apparatus, the combination, with an evaporator of any one effect and degree of vacuum, of a liquid-transfer pipe leading therefrom past one or more of the successive effect evaporators to an evaporator beyond having a greater degree of vacuum than the intervening evaporator or evaporators, for securing the advantage of a better vacuum, to facilitate the transfer and circulation of liquid from one evaporator to the other.

10. In a vacuum evaporating apparatus, a primary evaporator and a connecting liquid-feed pump, in combination with a transfer-pipe for partially-reduced liquid, leading from such evaporator past one or more of the succeeding evaporators to the feed-pipe of an evaporator having a greater degree of vacuum than the intermediate evaporator, whereby improved feed and circulation of liquid are secured.

11. In a multiple-effect vacuum evaporating apparatus, a primary evaporator having a separating-chamber, in combination with a liquid-feed pump connecting with the inlet end of the evaporator, a liquid-transfer pipe for partially-reduced liquid, leading from the separating-chamber of the primary evaporator past the second evaporator to the inlet end of the third evaporator of the series, a vapor-pipe connecting each evaporator with the next one in succession from the first to the last, and an exhaust device connecting with the last evaporator of the series, for the purpose described.

12. In a multiple-effect vacuum evaporating apparatus, a series of evaporators, each having a separating-chamber, a series of vapor-pipes connecting the evaporators in successive order from first to last, and an exhaust device connecting with the last evaporator of the series, in combination with a liquid-feed pump connecting with the inlet ends of the first and second evaporators of the series, and a liquid-transfer pipe leading from each separating-chamber past the next succeeding evaporator into the inlet end of the third evaporator from starting-point throughout the series, for the purpose of securing the advantages of a greater number of degrees of vacuum, for facilitating the flow and circulation of partially-reduced liquid from one evaporator to the other, whereby an increased number of evaporators may be used in a series and more economical results secured.

13. A separating-chamber provided with numerous small open-ended tubes and an arresting-plate placed near their discharge ends for separating liquid or solid matter from the vapor arising from the liquid being evaporated.

14. In combination with a separating-chamber, A′, having the evaporating-coils discharging into one end, the tube-sheet r, placed near such end and carrying open tubes n, and arresting-plate b′, placed in front of the discharging ends of tubes n, for the purpose described.

15. A catch-all chamber, E′, having tube-sheet o placed near its vapor-inlet end and carrying open tubes extending to near its opposite end plate, and outlet-pipe d′, extending back from the rear end plate and connecting with outlet vapor-pipe D′, for the purpose described.

16. In combination with two or more vacuum evaporators, each composed of a heating-chamber containing evaporating tubes or coils and a separating-chamber, the catch-all chambers containing small tubes and arresting-plates, and connected in the vapor-pipes leading from each separating-chamber to the heating-chamber of the adjacent evaporator, for the purpose described.

17. In a multiple-effect vacuum evaporating apparatus, the combination, with the last two evaporators of the series and their separating-chambers, as A³ and A⁴, of the liquid-transfer pipe S, connecting the separating-chambers together, and a liquid-discharge pipe leading directly from the last separating-chamber of the series, whereby the finished liquid of the two chambers may be mingled, cooled, and discharged together.

18. In a multiple-effect vacuum evaporating apparatus, the combination, with the last two evaporators of the series and their separating-chambers, of a liquid-transfer pipe connecting the two separating-chambers, a liquid-discharge or tail pipe leading from the last separating-chamber, a connected tail-pump for drawing off the liquid, and a vapor-exhaust device, also connecting with the last separating-chamber, for the purpose described.

19. In a multiple-effect vacuum evaporating apparatus, the last two evaporators of the series and their separating-chambers, in combination with liquid-supply pipes connecting with the inlet ends of the evaporators, an exhausting device connecting with the last separating-chamber, and a liquid-transfer pipe connecting the two separating-chambers, whereby the finished liquids of the two may be mingled, cooled to the same temperature, and together subjected to the vaporizing effect of the exhausting device preparatory to discharge from the apparatus.

In testimony whereof I affix my signature in presence of two witnesses.

HOMER T. YARYAN.

Witnesses:
FREDK. B. DODGE,
J. M. STEPHENS.